US012673321B2

(12) United States Patent
Riester et al.

(10) Patent No.: US 12,673,321 B2
(45) Date of Patent: Jul. 7, 2026

(54) SYSTEM AND A DEVICE FOR DETECTING A TARGET ANALYTE

(71) Applicant: MIDGE MEDICAL GMBH, Berlin (DE)

(72) Inventors: Markus Riester, Wiesbaden (DE); Ulf Thiele, Berlin (DE)

(73) Assignee: MIDGE MEDICAL GMBH, Berlin (DE)

( * ) Notice: Subject to any disclaimer, the term of this patent is extended or adjusted under 35 U.S.C. 154(b) by 510 days.

(21) Appl. No.: 18/250,787

(22) PCT Filed: Oct. 29, 2021

(86) PCT No.: PCT/EP2021/080189
§ 371 (c)(1),
(2) Date: Apr. 27, 2023

(87) PCT Pub. No.: WO2022/090501
PCT Pub. Date: May 5, 2022

(65) Prior Publication Data

US 2023/0390762 A1 Dec. 7, 2023

(30) Foreign Application Priority Data

Oct. 29, 2020 (EP) .................................... 20204790

(51) Int. Cl.
*B01L 3/00* (2006.01)
*B01F 33/302* (2022.01)
(Continued)

(52) U.S. Cl.
CPC ............... *B01L 3/5025* (2013.01); *B01L 7/52* (2013.01); *B01L 2200/10* (2013.01); *B01L 2300/0816* (2013.01)

(58) Field of Classification Search
CPC ............. B01L 3/50273; B01L 2300/16; C12Q 1/6874
See application file for complete search history.

(56) References Cited

U.S. PATENT DOCUMENTS

| | | | | |
|---|---|---|---|---|
| 2015/0238978 | A1 | 8/2015 | Muller et al. | |
| 2020/0061605 | A1* | 2/2020 | Edmiston | G01N 35/04 |
| 2020/0278368 | A1 | 9/2020 | Hopper | |

FOREIGN PATENT DOCUMENTS

| | | |
|---|---|---|
| WO | WO 2019/014239 | 1/2019 |
| WO | WO 2021/094746 | 5/2021 |

OTHER PUBLICATIONS

Extended Search Report for Eruopean Patent Application No. 20204790.8, dated Apr. 26, 2021, 7 pages.

(Continued)

*Primary Examiner* — Jennifer Wecker
*Assistant Examiner* — Oyeleye Alexander Alabi
(74) *Attorney, Agent, or Firm* — Sheridan Ross P.C.

(57) ABSTRACT

According to the invention, a diagnostic testing device is provided that comprises a plurality of detection chambers that are arranged in a geometric pattern. Each detection chamber comprises a receptacle for a sample container (14) containing a sample to be tested for luminescence. The diagnostic testing device further comprises a plurality of sensors, each sensor being assigned to a respective one of the detection chambers, energy supply means, a wireless data interface, a controller and a data memory. The data memory comprises a data structure, for instance a data base, wherein for each detection chamber a plurality of entries are provided that each are assigned to one individual detection chamber. The plurality of entries assigned to an individual detection chamber comprises at least an entry that indicates the presence or absence of a testing chamber in the individual detection chamber and an entry that indicates a detection or non-detection of a diagnostic feature by the sensor of the individual testing chamber.

15 Claims, 7 Drawing Sheets

Figure 1:
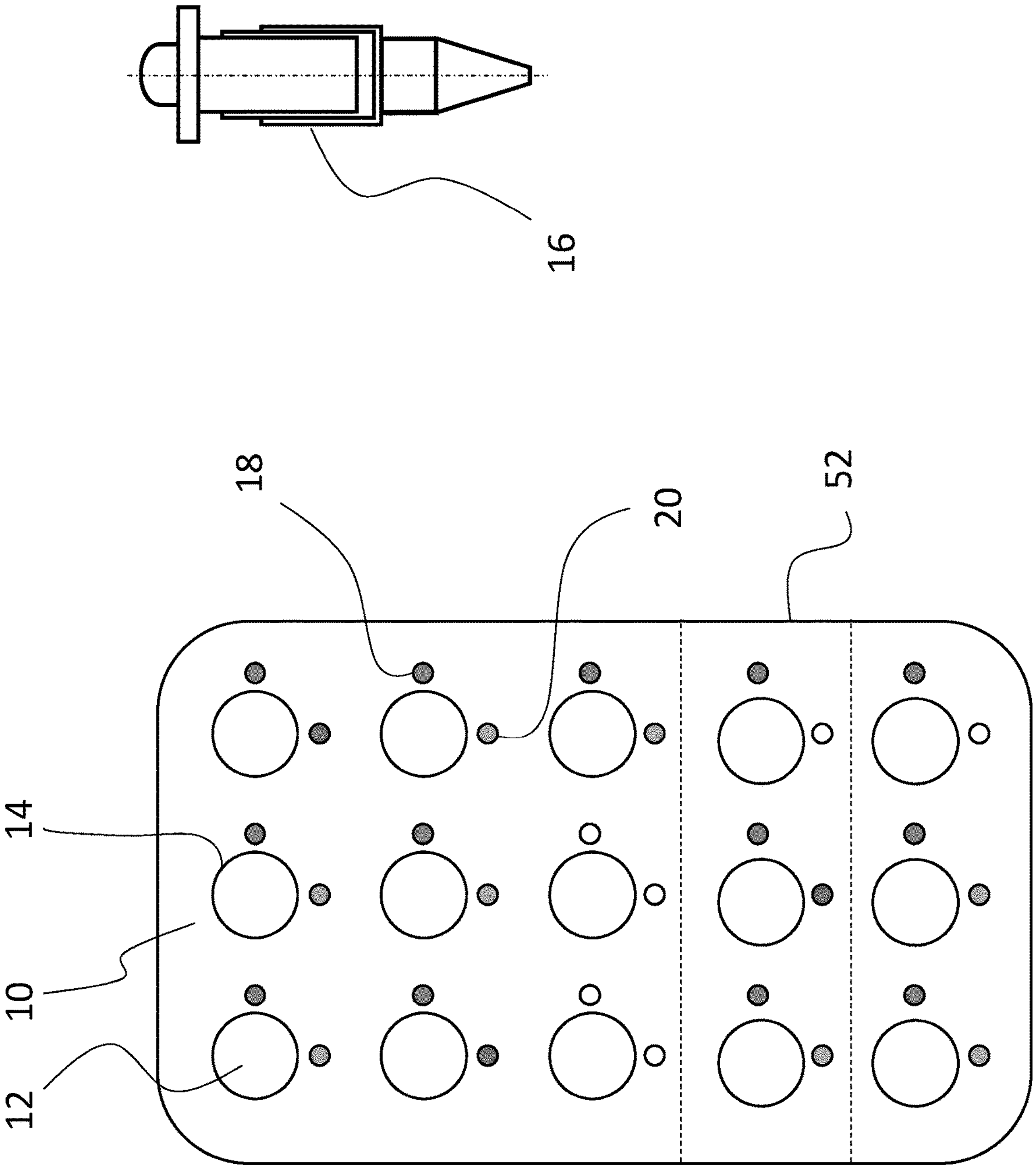

(51) Int. Cl.

| | |
|---|---|
| ***B01F 33/3033*** | (2022.01) |
| ***B01L 7/00*** | (2006.01) |
| ***B33Y 80/00*** | (2015.01) |
| ***C12M 1/00*** | (2006.01) |
| ***C12M 1/34*** | (2006.01) |
| ***C12M 3/00*** | (2006.01) |
| ***C12M 3/06*** | (2006.01) |
| ***C12Q 1/6848*** | (2018.01) |
| ***C12Q 1/686*** | (2018.01) |
| ***C12Q 1/6874*** | (2018.01) |
| ***G01N 21/29*** | (2006.01) |

(56) References Cited

OTHER PUBLICATIONS

International Search Report and Written Opinion for International (PCT) Patent Application No. PCT/EP2021/080189, dated Feb. 10, 2022, 14 pages.

Daher et al. "Recombinase Polymerase Amplification for Diagnostic Applications," Clinical Chemistry, 2016, vol. 62, No. 7, pp. 947-958.

Fonin et al. "Intrinsically disordered proteins in crowded milieu: when chaos prevails within the cellular gumbo," Cellular and Molecular Life Sciences, 2018, vol. 75, pp. 3907-3929.

Kunze et al. "On-Chip Isothermal Nucleic Acid Amplification on Flow-Based Chemiluminescence Microarray Analysis Platform for the Detection of Viruses and Bacteria," Analytical Chemistry, 2016, vol. 88, pp. 898-905.

Wanrska et al. "RecA Proteins from Deinococcus geothermalis and Deinococcus murrayi—Cloning, Purification and Biochemical Characterisation," BMC Molecular Biology, 2011, vol. 12, No. 17, 13 pages.

* cited by examiner

| Sensor_mn | Seat Occupied<br>y/n | Sample chamber inserted<br>y/n | Fluorescence<br>y/n |
|---|---|---|---|
| Sensor_11 | 1 | 1 | 0 |
| Sensor_12 | 1 | 1 | 0 |
| Sensor_13 | 1 | 1 | 1 |
| Sensor_21 | 0 | 0 | 0 |
| Sensor_21 | 0 | 0 | 0 |
| Sensor_22 | 1 | 1 | 0 |
| Sensor_23 | 1 | 1 | 0 |
| Sensor_31 | 1 | 1 | 1 |
| … | | | |

Fig. 4

SYSTEM AND A DEVICE FOR DETECTING A TARGET ANALYTE

CROSS REFERENCE TO RELATED APPLICATIONS

This application is a national stage application under 35 U.S.C. 371 and claims the benefit of PCT Application No. PCT/EP2021/080189 having an international filing date of 29 Oct. 2021, which designated the United States, which PCT application claimed the benefit of European Patent Application No. 20204790.8 filed 29 Oct. 2020, the disclosures of each of which are incorporated herein by reference in their entireties.

The invention relates to a system and a device for detecting a target analyte, in particular a target nucleic acid, for instance DNA or RNA, by way of isothermal nucleic acid amplification and fluorescence.

Nucleic acid amplification technologies are used to amplify the amount of a target nucleic acid in a sample in order detect such target nucleic acid in the sample. A known nucleic acid amplification technology is Polymerase Chain Reaction (PCR). Isothermal nucleic acid amplification technologies offer advantages over polymerase chain reaction (PCR) in that they do not require thermal cycling or sophisticated laboratory equipment.

Known isothermal nucleic acid amplification technologies are inter alia Recombinase Polymerase Amplification (RPA) and Strand Invasion Based Amplification (SIBA) and other methods known to persons skilled in the art.

Recombinase polymerase amplification (RPA), is a method to amplify the amount of a target analyte, in particular a nucleic acid such as DNA or RNA in a sample. For Recombinase polymerase amplification three core enzymes are used: a recombinase, a single-stranded DNA-binding protein (SSB) and a strand-displacing polymerase. Recombinases can pair oligonucleotide primers with homologous sequences in duplex DNA. SSB binds to displaced strands of DNA and prevents the primers from being displaced. The strand-displacing polymerase begins DNA synthesis at sites where the primer has bound to the target DNA. Thus, if a target gene sequence is indeed present in the tested sample, an exponential DNA amplification reaction can be achieved to amplify a small amount of a target nucleic acid to detectable levels within minutes at temperatures between 37° C. and 42° C.

The three core RPA enzymes can be supplemented by further enzymes to provide extra functionality. Addition of exonuclease III allows the use of an exo probe for real-time, fluorescence detection. If a reverse transcriptase that works at 37° C. to 42° C. is added then RNA can be reverse transcribed and the cDNA produced amplified all in one step.

By adding a reverse transcriptase enzyme to a RPA reaction, it can detect RNA as well as DNA, without the need for a separate step to produce cDNA. It is an advantage of RPA that it is isothermal and thus only requires simple equipment. While RPA operates best at temperatures between 37° C. and 42° C. it still works at room temperature.

For detecting the presence of a targeted nucleic acid in a sample, fluorescence detection technique can be used. After the light source at specific wavelength illuminates on the targeted nucleic acids, the DNA-binding dyes or fluorescein-binding probes of the nucleic acids will react and enable fluorescent signals to be emitted. The fluorescent signal is an indication of the existence of the targeted nucleic acids.

Fluorescence detection technique requires a fluorescence detection device. Typically, such devices are part of laboratories that render the service of analysing samples. This implies, that samples must be sent to such laboratories in order to have them analysed.

It is an object of the invention facilitate the testing of samples in particular by means of nucleic acid amplification technology.

According to a first aspect of the invention, a diagnostic testing device is provided that comprises a plurality of detection chambers that are arranged in a geometric pattern.

Each detection chamber comprises a receptacle for receiving a sample container (14) containing a sample to be tested for luminescence.

The diagnostic testing device further comprises

- a plurality of sensors, each sensor being assigned to a respective one of the detection chambers,
- energy supply means,
- a wireless or wirebound data interface,
- a controller and
- a data memory.

The data memory comprises a data structure, for instance a data base, wherein for each detection chamber a plurality of entries are provided that each are assigned to one individual detection chamber. The plurality of entries assigned to an individual detection chamber comprises at least an entry that indicates the presence or absence of a testing chamber in the individual detection chamber and an entry that indicates a detection or non-detection of a diagnostic feature by the sensor of the individual testing chamber. Ideally, this correlation is generated automatically through the presence of the testing chamber. No further input or read-out of a code is required. The data structure defines for which detection chambers the need for a sample container in that individual testing chamber exists. The entries in the data structure that define which detection chambers need to be provided with a sample container preferably can be configured by a user via an interface of an external device. Thus it is possible to define for a testing scenario which samples are needed for a complete testing of all passengers of a plane, for instance. If, for example, not all seats in a plane are occupied, only samples for the occupied seats are needed but not for those that are not occupied. Since the geometric arrangement of testing chambers and receptacles corresponds to the arrangement of the seats of the plane, only for those testing chambers a need for a sample is registered that correspond to an occupied seat.

In one embodiment, for each person to be tested—according to the occupied sets, for instance—one detection chamber is provided. Since the arrangement of the detection chambers may correlate with the arrangement of seats, it is easy for a user to place test containers containing probes from the individual passengers in the right detection chambers. If there are more testing chambers than persons to be tested—for instance because a smaller room of the theatre is used—some test detection chambers may not be used.

In an alternative embodiment, more than one detection chamber may be assigned to each individual person. Thus, multiple tests for each individual person may be performed simultaneously. In such embodiment, the data structure not only assigns one detection chamber to one individual (one-to-one) but assigns more than one, for example three detection chambers to one individual person and further defines which of these detection chambers is assigned to which sort of test. Thus, three different tests per individual person can be performed simultaneously. Again, the spatial arrangement of the detection chambers is associated to the tests to be carried out, the position of each detection chamber is associated to the test to be performed with this detection chamber.

Also, different seating configurations of individual aircraft, theatres or the like can be easily implemented. It is understood that this principle can be used for other mass transportation means or other use cases where the individual positioning of groups of individuals is a relevant piece of information, for example the seating arrangement in a theatre.

The controller is configured

- to read out the sensors and to determine whether the detection chamber assigned to a respective sensor contains a sample container and to generate a signal indicating presence or absence of a sample container in the individual detection chamber,
- to compare the signal indicating presence or absence of a sample container in the individual detection chamber with an entry in data structure (data base) to which the respective detection chamber is assigned, said entry indicating the need for a sample container in that individual detection chamber, and
- to generate a first warning signal if the comparison indicates that a need for a sample container in that individual detection chamber is not met, The controller is further configured

- to read out at least the sensors of those detection chambers that contain a sample container,
- to determine whether or not the output signal of the individual sensor indicates the presence of the diagnostic feature and
- to cause an entry in the data structure (data base) that is assigned to the detection chamber for which the sensor output signal indicated that the diagnostic feature was detected, said entry indicating the detection of the diagnostic feature.

Because the detection chambers are arranged in a geometric pattern, the diagnostic testing device according to the invention enables spatial arrangement of multiple samples to be tested in a pattern that corresponds to real life arrangements of humans to be tested. For example, the arrangement of the detection chambers of the diagnostic testing device may correspond to seats of a public transportation vehicle such as an airplane or a bus or a train. Alternatively, the geometric pattern of the detection chambers may correspond to rooms in a hotel, to seats in a restaurant or the like. It is also possible, that the individual detection chambers are assigned to blocks of a stadium. In the latter case, samples from the persons of one block would be tested in one detection chamber that is assigned to that block.

The arrangement of the detection chambers in a geometric pattern makes it easier for a user and less error-prone to carry out multiple tests with samples that belong to persons at specific places. Further, managing a plurality of tests is facilitated by means of the controller and the data structures stored in the memory that is connected to the controller. In the data structure, entries are provided, wherein one or more entries relate to each individual detection chamber. The entries of the data structure can be used to indicate to the detection device and thus to the user for which places tests should be carried out. Further, the results of the tests can be easily shown to a user in a single, easy to read view.

In a preferred embodiment, the controller is configured to generate a second warning signal in case an output signal of a sensor indicates detection of the diagnostic feature.

The controller can be a microcontroller and/or a state machine.

Preferably, the diagnostic testing device is a fluorescence detection device comprising at least one light source for inducing fluorescence. The sensors preferably are optical sensors for sensing fluorescence. There can be one light source for multiple detection chambers and light-guiding means for guiding the light to different detection chambers. Preferably, for each detection chamber at least one light sensor is provided.

The diagnostic testing device preferably is modular, allowing adding of further detection chambers. Modules with detection chambers each comprise a data interface and a snap-in connector so they can be coupled the testing device with the controller, both mechanically and data-wise. Thus the number of available detection chambers can be increased it needed. Further, a modular mechanical arrangement allows arranging of the detections chambers the match the geometry of the real-world locations (for instance seats in an airplane).

The diagnostic testing device may further comprise heating means that allow heating of an amplification chamber that is inserted in the fluorescence detection device.

Next to each receptacle, one or more status indicating means, for instance status indicating lights can be arranged. In particular, two status-indicating lights can be arranged next to each receptacle. One status indicating light is provided for indicating the need for a sample container in the respective receptacle. The other status indicating light is provided for indicating whether or not a fluorescence was detected by the optical sensor that is assigned to the detection chamber. Instead of arranging status indicating means on the testing device, the status of each detection chamber may be indicated on a display of an external device in a spatially coordinated manner. The representation on the display would then correspond to the spatial arrangement of the detection chambers on the testing device.

In combination with a data structure that defines which detection chambers need to be provided with a sample container the controller preferably is configured for controlling the status indicating light for indicating the need for a sample container in correspondence with the data structure. Thus, only those status indicating light for indicating the need for a sample container will be lit that belong detection chambers that need to be provided with a sample container.

Preferably, diagnostic testing device comprises a wireless data communication interface for communicating data to an external device, for instance a mobile device such as a smartphone or a tablet computer.

It is further preferred if the controller of the diagnostic testing device is configured to receive configuration data from an external device. Preferably, the configuration data comprises signals indicating for with detection chambers samples are need. The configuration data serves for configuring the data structure that defines which detection chambers need to be provided with a sample container.

The external device may have an interface to a booking system for receiving data about booked or occupied seats, rooms or the like. Alternatively or additionally, the external device may have graphic user interface showing a representation of places that can be occupied and thus would require a testing of the respective individual. The graphic user interface preferably is configured for allowing manual selection of occupied places thus defining for which detections chambers samples are needed. Preferably, the graphical user interface comprises a touch sensitive graphic display so places can be selected by simple touch gestures of a user.

A further aspect of the invention is a system for detecting target DNA in a biological sample, said system comprising a fluorescence detection device and a plurality of sample containers. Preferably, the system is adapted for transcribing an RNA to a DNA in a biological sample and detecting the target DNA, said system comprising a fluorescence detection device and a sample container.

Each sample container of such system preferably comprises at least two distinct chambers that can be combined to form a single, fluid tight assembly. A first chamber preferably comprises a first set of chemicals and/or agents. The first chamber is closed prior to use. A second chamber comprises a second set of chemicals and/or agents that are at least in part distinct from the chemicals and/or agents of the first set. The first chamber comprises a lid that can be opened when the first chamber and the second chamber are combined to form a single, fluid tight assembly, in order to allow the contents of the first chamber to enter the second chamber.

According to a second aspect of the invention, a system is provided that comprises a fluorescence detection device and a sample container comprised of a lysis chamber and an amplification chamber that can be combined to a fluid-tight unit.

The lysis chamber may contain a lysing fluid that causes lysing of the cells in a sample to thus release the nucleic acids (DNA or RNA). The lysing fluid may comprise an acid, e.g. HCl or a weak alkali, and a surface active agent.

The amplification chamber contains a mixture that comprises a recombinase, a single-stranded DNA-binding protein (SSB) and strand-displacing polymerase that causes a recombinase polymerase amplification (RPA). The amplification chamber further contains exonuclease III allows the use of an exo probe for real-time, fluorescence detection.

Preferably, the system also comprises a piston, with a lid for closing the lysis chamber and the amplification chamber.

The combination of the lysis chamber and piston is arranged such that in the event of the piston moving into the lysis chamber pressure release is possible through venting. The venting means are configured to prevent content of either the lysis chamber or the amplification chamber or both from escaping out of the respective chamber or chambers.

The system is configured to implement an isothermal amplification method such as RPA and SIBA and other methods, preferably isothermal methods. The amplification method is configured to be carried out in a temperature range between 25° C. and 47° C. In various embodiments, initial heating may be applied. Other embodiments implement continuous heating. There are also embodiments without any external heating in one or more of the method steps.

Preferably each chamber is an integral unibody. In an alternative embodiment, the assembly of the first chamber and the second chamber is an integral unibody.

Preferably, the chambers can be connected by means of a fluid tight snap fit connection to thus form a single, fluid tight assembly. As an alternative to a snap fit connection, a screw lock connection similar to a Luer-lock can be provided for tightly connecting the chambers. Another alternative is a press fit connection between the chambers.

The advantage of a fluid tight assembly of at least two chambers is that the assembly can be disposed easily without the risk of contamination because the contents of the assembly is tightly secured within the assembly.

Preferably, the second chamber has transparent walls that allow excitation and detection of luminescence and in particular fluorescence.

An assembly comprising two initially separate chambers and a fluorescence detection device with a receptacle that can receive the assembly for luminescence detection makes it possible to perform a testing method that comprises two consecutive chemical or biochemical method steps—for instance lysis and amplification—and a luminescence testing step in a simple, clean and safe manner that minimizes the risk of contamination and infection while providing easy handling. The fluorescence detection device can be re-used because in use it is not contacted by the sample or any agents or chemicals since these are tightly enclosed in the assembly of chambers. The assembly of chambers and its contents can be safely disposed after use because the contents is reliably kept within the interior of the assembly.

The testing device and the container with samples to be tested can be configured for different kind of tests, for instance detecting the presence or absence of one or more specific molecules in a probe.

Figure 2:
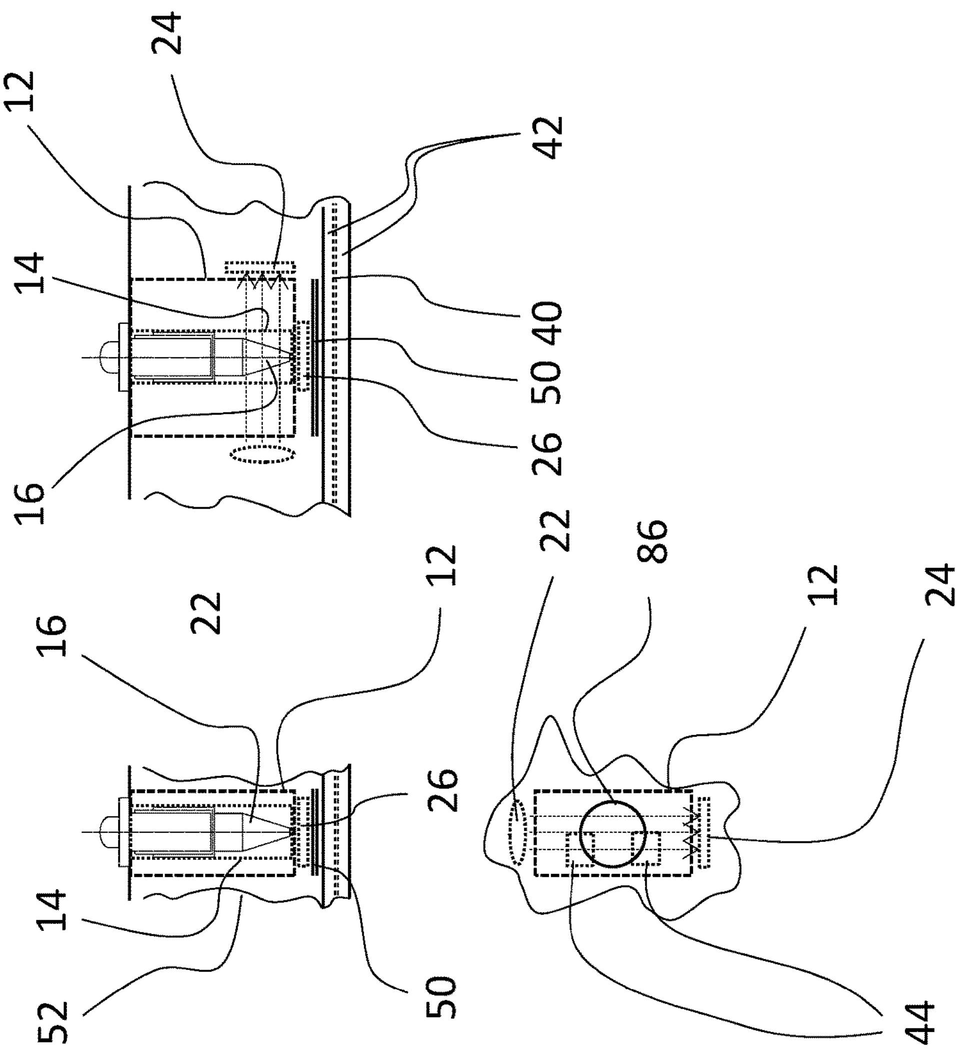
Figure 3:
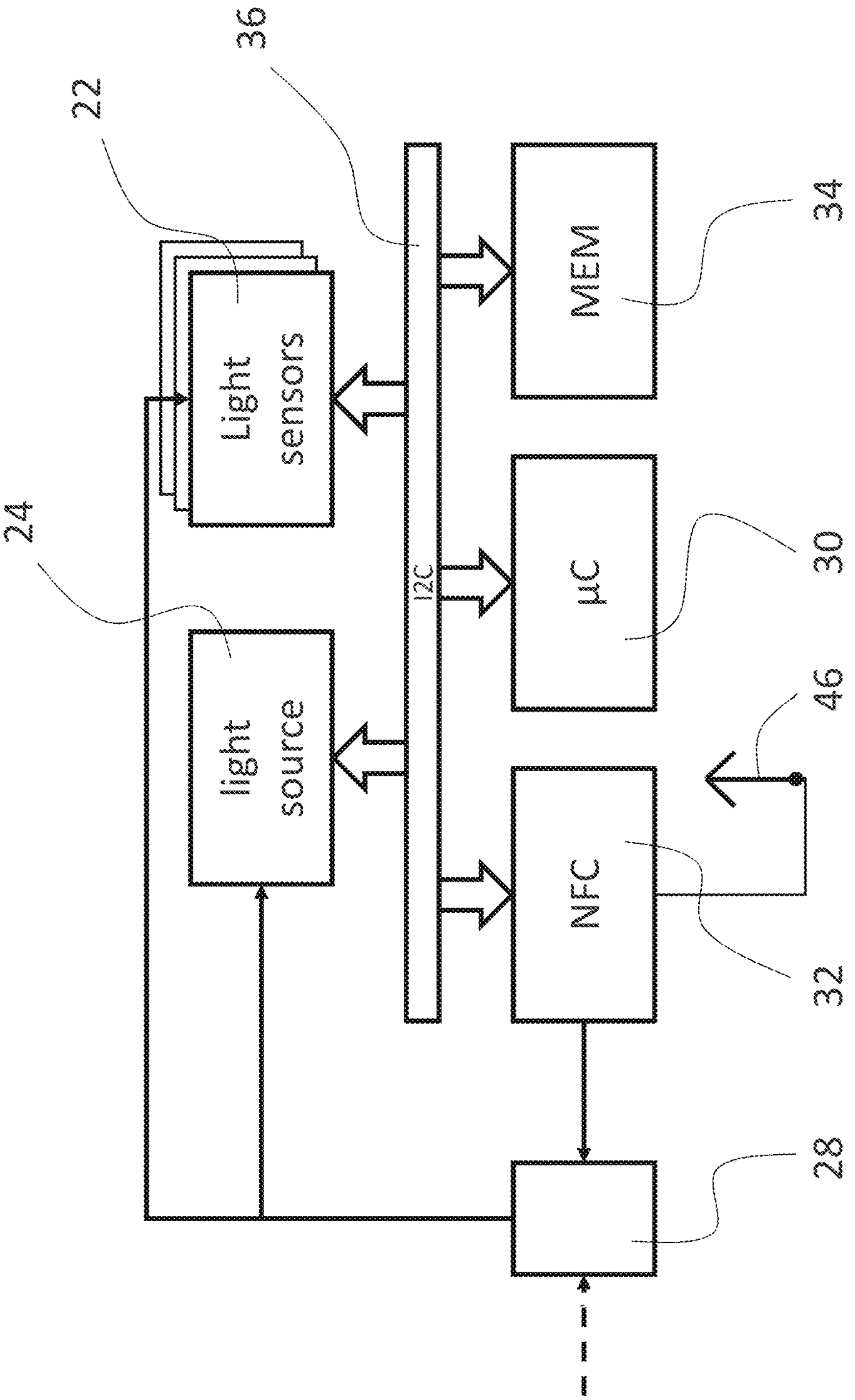
Figure 5:
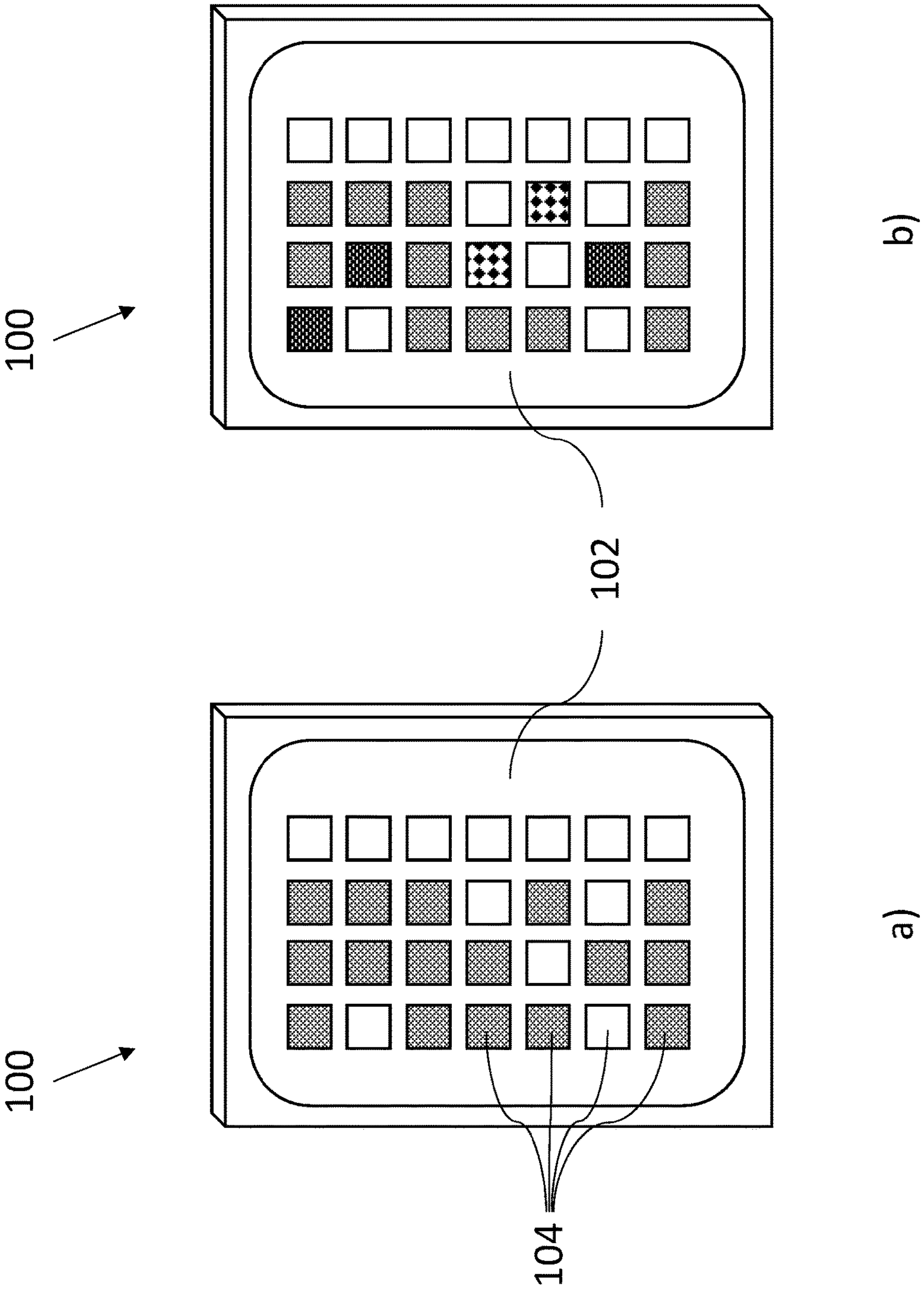
Figure 6:
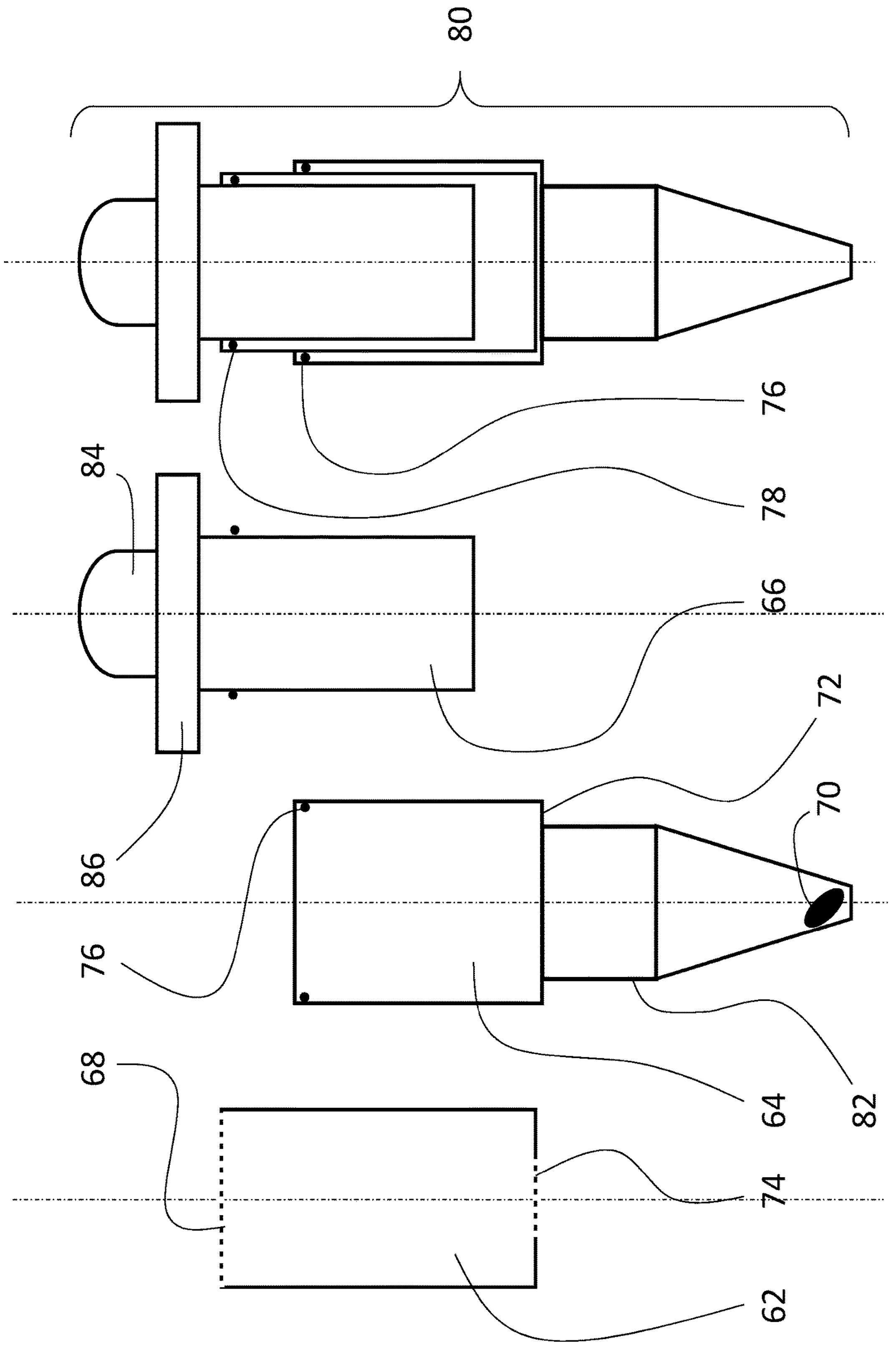
Figure 7:
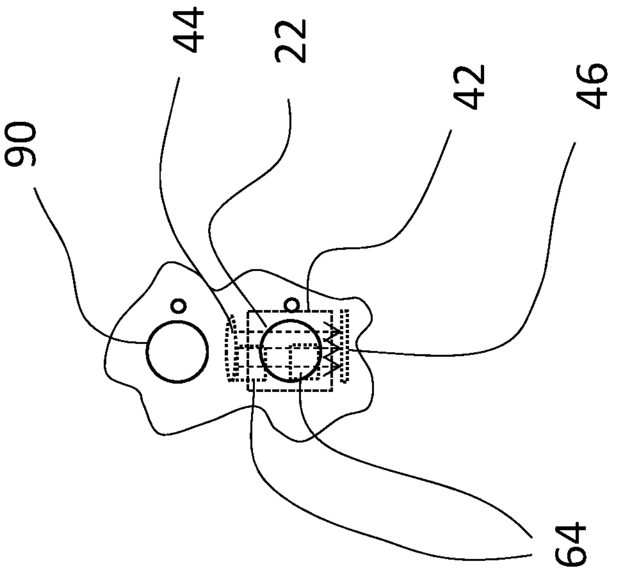

The invention shall now further be illustrated by way of an example and with a reference to the figures. Of the figures, FIG. 1: shows a fluorescence detection device and a sample container according to the invention;

FIG. 2: shows a schematic cross-sectional view of a detection chamber of the detection device of FIG. 1;

FIG. 3: is a schematic block diagram of the detection device of FIG. 1;

FIG. 4: illustrates a data structure stored in the memory of the detection device of FIG. 1;

FIG. 5*a, b*: illustrate an external device to be used in combination with the fluorescence detection device FIG. 6: shows the sample container of FIG. 1 in more detail; and FIG. 7: is a schematic diagram of a detection chamber and an alternative detection device comprising a second receptacle next to each receptacle of the detection chambers.

The exemplary embodiment of a diagnostic testing device according to the invention is a fluorescence detection device 10 as illustrated in the figures.

The fluorescence detection device 10 comprises a plurality of detection chambers 12 that are arranged in a geometric pattern. Each detection chamber 12 comprises a receptacle 14 for receiving a sample container 16 as shown on the left side of FIG. 1. Of course alternative sample container that fit into the receptacles 14 can be used.

Next to each receptacle 14, two status indicating lights 18 and 20 are arranged. One status indicating light 18 is provided for indicating the need for a sample container in the respective receptacle. The other status indicating light 20 is provided for indicating whether or not a fluorescence was detected by an optical sensor 226 that is assigned to the detection chamber 12.

The broken lines in FIG. 1 indicate that the fluorescence detection device 10 may be modular and thus expandable.

In the illustrated, preferred embodiment, the receptacles 14 are part of the detection chambers 12. Within each detection chamber 12 or adjacent an individual detection chamber 12 a light source 22 and the optical sensors 24 and 26 are arranged; see FIG. 2. The light source 22 is configured to illuminate the contents of the detection chamber 12 with a light that can cause fluorescence in a sample to be tested during and after the sample has undergone recombinase polymerase amplification. The optical sensor 24 is arranged and configured to detect absorption or attenuation (e.g. due to straying of light) in the detection chamber 12. The optical sensor 26 is arranged and configured to detect fluorescence in the detection chamber 12 in case luminescence occurs. The optical sensor 26 is arranged so that no direct light form light source 22 can impede on sensor 26. Accordingly, fluorescence is the diagnostic feature to be detected in testes performed by the fluorescence detection device.

In further embodiments, only one optical sensor, in particular a sensor for capturing fluorescence is provided. In alternative embodiments, two or more light sources are provided, the light source can be configured to emit light with different wavelengths.

To power up the light source 22 and the optical sensors 24 and 26, an energy supply 28 is provided; see FIG. 3. The energy supply 28 may comprise a battery, preferably a rechargeable battery. Alternatively or additionally, energy supply 28 may comprise a power interface for connecting the fluorescence detection device 16 to an external power supply. The power interface may be wire-bound or wireless. The energy supply 28 may also comprise solar cells for providing photovoltaic power supply.

The light source 22 and the optical sensors 24 and 26 are further connected to controller 30 that is configured to control the operation of the light source 22 and the optical sensors 24 and 26 and to further read out a sensor output signals provided by the optical sensors 24 and 26. Controller 30 can be a microcontroller or a state machine.

The controller 30 is operatively connected to a wireless data interface 32 that is configured to allow for a data communication between the microcontroller 50 and an external device such as a mobile phone or another device for data communication and data processing.

Preferably, the wireless data interface 32 is operatively connected to the controller 30, to the energy supply 28 and to a data memory 34.

In particular, the wireless interface 32 implements means for near field communication (NFC) and comprises a data bus such as a I2C data bus 36 for communication with the controller 50. The wireless data interface 32 preferably is configured to allow bidirectional data communication so as to transmit data generated by the fluorescence detection device 10 to an external device and to receive the control commands and/or software updates from an external device so that the fluorescence detection device 10 can be controlled and updated by way of an external device.

The wireless data interface 32 may also implement WIFI-communication as an alternative to near field communication. Another alternative is Bluetooth-communication.

The memory 34 preferably comprises a data structure, for instance a data base, wherein for each detection chamber a plurality of entries are provided that each are assigned to one individual detection chamber; cf. FIG. 4. The plurality of entries assigned to an individual detection chamber comprises at least an entry that indicates the presence or absence of a testing chamber in the individual detection chamber and an entry that indicates a detection or non-detection of luminescence by the optical sensor of the individual testing chamber.

The controller 30 is configured

- to read out the optical sensors and to determine whether the detection chamber assigned to a respective sensor contains a sample container and to generate a signal indicating presence or absence of a sample container in the individual detection chamber
- to compare the signal indicating presence or absence of a sample container in the individual detection chamber with an entry in data structure (data base) to which the respective detection chamber is as-signed, said entry indicating the need for a sample container in that individual detection chamber, and
- to generate a first warning signal if the comparison indicates that a need for a sample container in that individual detection chamber is not met, The controller is further configured

- to read out at least the optical sensors of those detection chambers (12) that contain a sample container,
- to determine whether or not the output signal of the individual optical sensor indicates luminescence and
- to cause an entry in the data structure (data base) that is assigned to the detection chamber for which the optical sensor output signal indicated that luminescence was detected, said entry indicating that luminescence was detected.

Preferably, all electronic components that implement the wireless data interface 32, the controller 30 and the data memory 34 are arranged on a flat printed circuit board 40. The flat printed circuit board 40 can be part of a laminated card wherein the electronic components are arranged between two laminated cover sheets 42. Electric contacts 44 on the surface of one or both cover sheets 60 allow communication and energy transfer between the electronic components and further components such as the light sources 242 or the optical sensors 24 and 26. Alternatively, in other embodiments, the printed circuit board can be flexible, semi-flexible or a rigid-flexible board. The printed circuit board may be a conventional circuit board or a circuit board manufactured by printing or other additive methods, or combinations thereof.

In addition to the electronic components, the printed circuit board 40 that can be laminated between two cover sheets 42 also comprises at least one antenna 46 for wireless data communication.

Optionally, heating means 50 can be provided. The heating means may comprise an electric heating 50 that is integrated into the fluorescence detection device 10 and that can heat the sample container 16 and its contents to thus start and/or promote the amplification process. Preferably, the fluorescence detection device 10 is configured to automatically start electric heating once a sample container 16 is inserted into the receptacle 14. The insertion of a sample container 16 can be detected by means of a dedicated sensor, for instance a switch, or by means of the optical sensor 22. In particular, the optical sensor 22 can sense that a sample container 16 is inserted into the receptacle 14 because a collar 86 of the sample container 16 acting as a lid prevents external light from entering the detection chamber 12 once the sample container 16 is inserted in the receptacle 14. Accordingly, insertion of a sample container 16 into the receptacle 14 causes a drop in light intensity sensed by the optical sensor 22. Such drop in light intensity can be detected and can cause a starting signal for the electric heating.

Alternative chemical heating means are addressed further below.

The detection chamber 12 is arranged in a detection chamber housing 52 of the fluorescence detection device 10, said housing having outer dimensions allowing the fluorescence detection device 10 to be easily held by one hand.

FIG. 5 illustrates an external device 100 that is configured to be used in combination with the fluorescence detection device 10. The external device 100 may have the external shape of a smartphone or a tablet computer. The external device 100 features a touch screen 102. The external device is configured to for data communication with the controller 50 of the fluorescence detection device 10. In particular, the external device 100 is configured to transfer a configuration data set to the fluorescence detection device 10, the configuration data set comprising a data structure that defines which detection chambers need to be provided with a sample container.

The external device 100 is configured to provide a graphic user interface showing a representation of places that can be occupied and thus would require a testing of the respective individual. The graphic user interface can be operated via the touch screen 102 and is configured for allowing manual selection of occupied places thus defining for which detections chambers samples are needed. The graphic user interface comprises graphic representations 104 of seats or locations. The graphic representations 104 of seats are configured to respond to touch gestures for selecting or deselecting seats and thus setting up a data structure that defines which detection chambers need to be provided with a sample container; cf. FIG. 5*a*.

In addition, results from tests performed by the fluorescence detection device 10 can be transmitted to the external device 100 and can be shown on display 102. In FIG. 5*b*, some graphic representations 104 of seats are further highlighted to indicate a positive test result or a missing sample. Thus, the graphic representation on the display 102 may replace status indicating lights on the testing device.

The sample container 16 preferably is a fluid tight assembly comprising a lysis chamber 62, an amplification chamber 64 and a piston 66; see FIG. 6.

The lysis chamber 62 contains a lysing fluid that causes lysing of cells or viruses in a sample to be tested. By way of lysing, nucleic acids such as DNA or RNA are released by way of breaking down the cells or viruses in the sample to be tested. Lysing can be achieved by a lysing fluid that comprises an acid such as hydrochloric acid or a weak alkali. The lysis chamber 62 has a lid 68 so lysis chamber 62 can be opened and a sample to be tested can be entered in the lysis chamber 62. The contents of the lysis chamber 62 is about 100 μl.

Lid 68 of the lysis chamber 62 preferably is a membrane 68 that can be pierced by a cotton swab with a sample.

The amplification chamber 64 comprises a mixture of enzymes that are needed for a recombinase polymerase amplification (RPA). Preferably, the mixture is provided in the form of a dry pellet 70 that is contained in the amplification chamber 64.

The amplification chamber preferably is a cuvette that can be inserted in a receptacle 14 of the fluorescence detection device 10. The receptacle 14 is part of a detection chamber 12 of the fluorescence detection device 10.

The amplification chamber 64 is dimensioned to allow inserting the lysis chamber 62 into the amplification chamber in a tight and defined manner. An abutment 72 limits the depth of insertion. Once the lysis chamber 62 is fully inserted into the amplification chamber 64, the piston 66 can be used to transfer the fluid from the lysis chamber 62 into the amplification chamber 64 and allowing the recombinase polymerase amplification to work in the closed amplification chamber 64. To allow the transfer of the contents of the lysis chamber 62 into the amplification chamber 64, a further thin lid 74 is arranged at the bottom of the lysis chamber 62. The thin lid 74 is dimensioned to break under the fluid pressure caused by the piston 66. Alternatively, the piston 66 and the thin lid 74 can be designed so that a tip (not shown) of the piston can pierce the thin lid 74 of the piston 66.

The lysis chamber 62, the amplification chamber 64 and the piston 66 are configured to engage in a fluid-tight manner when fully inserted. Such fluid tight engagement can be achieved by means of a snap fit connection wherein an annular protrusion 76 of one of the lysis chamber 62 and the amplification chamber 64 engages in an annular groove of the respective other chamber. Likewise, an annular protrusion 78 of one of the piston 66 and the lysis chamber 62 engages in an annular groove of the respective other part. Annular protrusions 76 and 78 act as sealings and may be integrally formed with the rest of the respective chamber or piston.

As an alternative to a snap fit connection, a screw lock connection similar to a Luer-lock can be provided for tightly connecting the lysis chamber 62 and the amplification chamber 64.

To allow insertion of the lysis chamber 62 into the amplification chamber 64 and of the piston 18 into the lysis chamber 62, venting means (not shown) are provided.

Once fully engaged, the amplification chamber 64, the lysis chamber 62 and the piston 66 form a tight assembly 80 that can be handled as a single, fluid tight unit.

Walls 82 of the amplification chamber 64 are transparent so as to allow light to enter the amplification chamber 64 and to exit the amplification chamber 64. The transparent walls 82 of the amplification chamber 64 make it possible to expose the content of amplification chamber 64 to exiting light that can cause a fluorescence. In case, the content of the amplification chamber 64 is fluorescent fluorescence of the sample in the amplification chamber 64 can be detected through the transparent walls 82 of the amplification chamber 64.

The pellet 70 that contains the mixture of enzymes of four recombinase polymerase amplification preferably comprises a recombinase, a single-stranded DNA-binding protein (SSB) and a strand-displacing polymerase, exonuclease III and in case RNA is to be detected, a reverse transcriptase.

In use, a sample to be tested first is filled into lysis chamber 62. After lysing the cells in the sample to be tested, the entire content of lysis chamber 62 is transferred into the amplification chamber 64 by means of the piston 66 so that a recombinase polymerase amplification can occur in the amplification chamber 64.

Once the recombinase polymerase amplification has occurred in the amplification chamber 64—typically between 10 to 15 minutes after filling in the content of the lysis chamber 62 into the amplification chamber 64—the amplification chamber 64—or alternatively only is content—can be entered into the fluorescence detection device 10.

In the illustrated, preferred embodiment, the entire assembly 80 is inserted in the receptacle 14 of the fluorescence detection device 10. For handling of the assembly 80, a grip 84 is provided at a proximal end of the piston 66.

In order to prevent external light, for instance stray light, from entering into the receptacle once the assembly 80 is fully inserted in the receptacle 14, a collar is provided that forms a lid 86 for the receptacle 22.

As indicated above, alternatively or additionally to electrical heating means 50, heating means may be provided by chemicals in the amplification chamber 14 that undergo an exothermal reaction once a sample is filled in the amplification chamber 14. It is also possible that the lysis chamber 12 comprises a first component and the amplification chamber 14 comprises a second component wherein the two components can react exothermically. The exothermal reaction begins when the contents of the lysis chamber 12 is transferred into the amplification chamber 14.

Alternatively or additionally, the heating means may be provided by chemicals that undergo an exothermal reaction once a sample is introduced into the receptacle. These chemicals are arranged in proximity of the amplification chamber 64, in a separate sealed arrangement that contains the heating chemicals. Upon a trigger, the exothermic chemical reaction is started.

Another alternative that allows heating of the fluorescence detection device is proving a dark colour, for instance black, on the outside of the fluorescence detection device. Thus, the fluorescence detection device together with the amplification chamber can be solar heated. Preferably, temperature control means are provided that indicate potential overheating of the fluorescence detection device together with the amplification chamber. The temperature control means may comprise an ink or paint that changes its colour in case a predefined temperature is exceeded. Accordingly, an indicator that changes its colour at a certain temperature and that is applied to the outside of the fluorescence detection device may be a temperature control means.

As shown in FIG. 7, the fluorescence detection device 16' may provide a second receptacle 90 wherein the lysis chamber 62 can be placed prior to the connection with the amplification chamber 64. The second receptacle 90 can also host the amplification chamber 64 and the lysis chamber 62 prior to use.

The invention claimed is:

1. A diagnostic testing device comprising a plurality of detection chambers, each comprising a receptacle for a sample container containing a sample to be tested for a diagnostic feature, a plurality of sensors, each sensor being assigned to a respective one of the detection chambers, energy supply means a wireless or wirebound data interface a controller, and a data memory, wherein the plurality of detection chambers is arranged in a geometric pattern and wherein the data memory comprises a data structure wherein for each detection chamber a plurality of entries are provided that each are assigned to one individual detection chamber, the plurality of entries assigned to an individual detection chamber comprising at least an entry that indicates the presence or absence of a testing chamber in the individual detection chamber and an entry that indicates a detection or non-detection of the diagnostic feature by the sensor of the individual testing chamber, the controller is configured to read out the sensors and to determine whether the detection chamber assigned to a respective sensor contains a sample container and to generate a signal indicating presence or absence of a sample container in the individual detection chamber, to compare the signal indicating presence or absence of a sample container in the individual detection chamber with an entry in a data structure to which the respective detection chamber is as-signed, said entry indicating the need for a sample container in that individual detection chamber, to generate a first signal if the comparison indicates that a need for a sample container in that individual detection chamber is not met, wherein the controller is further configured to read out the sensors of those detection chambers that contain a sample container, to determine whether or not an output signal of the sensor indicates the presence of the diagnostic feature, and to cause an entry in the data structure that is assigned to the detection chamber for which the sensor indicated that the diagnostic feature was detected, said entry indicating the detection of the diagnostic feature, wherein the data structure can be configured via the data interface by means of an external device.

2. The diagnostic testing device according to claim 1, wherein the controller is configured to generate a second signal in case a readout of a sensor indicates presence or a quantitative measurable presence of the diagnostic feature.

3. The diagnostic testing device according to claim 1, further comprising heating means that allow heating of an amplification chamber that is inserted in a receptacle of the diagnostic testing device.

4. The diagnostic testing device according to claim 1, wherein in proximity to each detection chamber, one or more status indicating means for the detection chamber are arranged.

5. The diagnostic testing device according to claim 4, wherein first status indicating means are provided for indicating the need for a sample container in the respective receptacle.

6. The diagnostic testing device according to claim 4, wherein a second status indicating lights are provided for indicating whether or not a diagnostic feature was detected by the sensor that is assigned to the detection chamber.

7. The diagnostic testing device according to claim 1, further comprising a wireless data communication interface for communicating data to an external device, preferably a mobile device such as a smartphone.

8. The diagnostic testing device according to claim 1, wherein the controller of the diagnostic testing device is configured to receive configuration data from an external device.

9. The diagnostic testing device according to claim 1, further comprising at least one light source for inducing fluorescence.

10. The diagnostic testing device according to claim 1, wherein the sensors are optical sensors.

11. The diagnostic testing device according to claim 1, wherein the diagnostic testing device is configured to detect fluorescence as the diagnostic feature.

12. A system for detecting target DNA and RNA in a biological sample, said system comprising a diagnostic detection device according to claim 1 and at least one sample container.

13. The system according to claim 12, wherein the sample container comprises at least two distinct chambers that can be combined to form a single, fluid tight assembly, wherein a first chamber comprises a first set of chemicals and/or agents, said first chamber being closed prior to use, and wherein a second chamber comprises a second set of chemicals and/or agents that are at least in part distinct from the chemicals and/or agents of the first set, and wherein the first chamber comprises a lid, that can be opened when the first chamber and the second chamber are combined to form a single, fluid tight assembly, in order to allow the contents of the first chamber to enter the second chamber.

14. The system according to claim 13, wherein, wherein the first chamber is a lysis chamber containing a lysing fluid, and wherein the second chamber is an amplification chamber containing a mixture that comprises a recombinase, a single-stranded DNA-binding protein, strand-displacing polymerase and exonuclease.

15. The system according to claim 13, wherein the second chamber has trans-parent walls.

* * * * *